United States Patent
Kwoka

(10) Patent No.: US 6,668,993 B2
(45) Date of Patent: Dec. 30, 2003

(54) VISCOUS COUPLING

(75) Inventor: Georg Kwoka, Much (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 10/060,695

(22) Filed: Jan. 11, 2002

(65) Prior Publication Data

US 2003/0132082 A1 Jul. 17, 2003

(30) Foreign Application Priority Data

Jan. 13, 2001 (DE) .......................................... 101 01 407

(51) Int. Cl.$^7$ ............................................... F16D 47/06
(52) U.S. Cl. ........................ 192/35; 192/48.2; 192/57
(58) Field of Search ........................ 192/35, 48.2, 57, 192/58.42, 84.7, 84.91, 84.96

(56) References Cited

U.S. PATENT DOCUMENTS

| | | | | |
|---|---|---|---|---|
| 2,937,729 A | * | 5/1960 | Sperr, Jr. ................... | 192/84.7 |
| 4,899,859 A | * | 2/1990 | Teraoka ...................... | 192/221 |
| 5,080,210 A | * | 1/1992 | Hagiwara ................... | 192/48.3 |
| 5,083,986 A | * | 1/1992 | Teraoka et al. ............... | 475/86 |
| 5,161,658 A | * | 11/1992 | Hagiwara ................... | 192/48.3 |
| 5,366,421 A | * | 11/1994 | Hirota ........................ | 475/231 |
| 5,890,573 A | * | 4/1999 | Kwoka ........................ | 192/35 |
| 6,102,178 A | * | 8/2000 | Walton ........................ | 192/35 |
| 6,158,561 A | * | 12/2000 | Sakai et al. ................. | 192/35 |
| 6,443,282 B1 | * | 9/2002 | Kwoka ........................ | 192/57 |

FOREIGN PATENT DOCUMENTS

JP        2-26328 A   *  1/1990

* cited by examiner

*Primary Examiner*—Richard M. Lorence

(57) ABSTRACT

A viscous coupling comprising two parts which form an annular chamber 16 which is filled with a highly viscous fluid and in which first coupling plates 17 are connected to the first one of the parts 11 for rotation therewith and second coupling plates 18 are connectable to the second one of the parts 12 which are arranged so as to alternate in the longitudinal direction. The second coupling plates 18 are arranged so as to alternate with clamping rings 20 in the second one of the parts 12, which clamping rings 20, in turn, are connected to the second one of the parts 12 for rotation therewith. A first axial adjusting device 23 acts in an axial direction on the second coupling plates 18 and on the clamping rings 20 and locks the same relative to one another and to the second one of the parts 12. A brake assembly for the setting ring 24 comprises a second viscous coupling having a second annular chamber 30 which is filled with a highly viscous fluid and in which third coupling plates are connected to the setting ring 24 for rotation therewith. Fourth coupling plates are connectable to the other one of the two parts and are arranged so as to alternate in the longitudinal direction. The fourth coupling plates 32 are arranged so as to alternate with second clamping rings 34 on one of the parts, which clamping rings 34, in turn, are connected for rotation with one of the parts; and have a second axial adjusting device for the setting ring 24 of the brake assembly.

7 Claims, 1 Drawing Sheet

VISCOUS COUPLING

BACKGROUND OF THE INVENTION

The invention relates to a viscous coupling with two parts which are rotatable relative to one another around a common longitudinal axis. These two parts form an annular chamber which is filled with a highly viscous fluid. First coupling plates are connected to the first one of the parts for rotation therewith. Second coupling plates are connected to the second one of the parts and both sets of plates are arranged so as to alternate in the longitudinal direction. The second coupling plates are also arranged so as to alternate with clamping rings in the second one of the parts, and the clamping rings, in turn, are connected to the second one of the parts for rotation therewith. An axial adjusting device acts on the second coupling plates and on the clamping rings and axially locks the same relative to one another and to the second one of the parts.

It is known to use a viscous coupling in the driveline of a motor vehicle with a permanently driven first axle and an optionally driven second axle, wherein the parts of the coupling are connected to an input end and to an output end in a driveline leading to the second axle.

In the above respect, it is known to combine the viscous coupling with a freely controllable switching device which, by means of an axial adjusting device, connects one set of coupling plates alternating with clamping rings in the respective part of the coupling to the part of the coupling or disconnects it therefrom.

DE 40 36 230 C2 and DE 41 07 240 C2 describe the operational parameters that can be freely selected and on which such switching operation depends. Several proposals have already been made for designing such an adjusting device.

It is also known to combine the viscous coupling with a free-wheeling assembly which has a locking effect if the input end leads relative to the output end. The viscous coupling disconnects if the output end leads relative to the input end when the vehicle moves forwards. This is disadvantageous in that, during reversing, i.e. when the direction of rotation is reversed, the free-wheeling assembly disconnects the viscous coupling, and even if there is no grip at all at the first axle, the second axle is not connected. To overcome this disadvantage, it is necessary to provide an additional switching device by means of which the free-wheeling assembly can be bridged during reversing.

DE 197 30 714 A1 proposes a power transmitting unit with two coupling parts which are rotatable relative to one another, in the form of a friction coupling wherein a first pressure force generating unit for actuating the friction coupling is formed by a fluid pulse device and a second pressure force generating unit for actuating the friction coupling is formed by a ball/ramp assembly with two ramp discs which are rotatable relative to one another. The ball/ramp assembly is put into effect by braking one of its two ramp discs rotating together with one of the coupling parts. This braking action is achieved by a further friction coupling which is actuated in a contact-free way by an electromagnet which is operative between the brakable ramp disc and the other one of the coupling parts.

DE 199 18 411 A1 discloses a viscous coupling for transmitting power between two coupling parts which are rotatable relative to one another. The viscous coupling is provided with two sets of viscous plates which are arranged in an annular chamber filled with a viscous fluid and of which the one set can be coupled by means of coupling plates to the associated coupling part and uncoupled therefrom. The pressure force applied to the coupling plates is generated by a ball/ramp assembly with two ramp discs which are rotatable relative to one another. The ball/ramp assembly is actuated by one of its two stationary ramp discs which is rotated by an electric motor.

DE 199 02 388 A1 proposes combining a viscous coupling with a friction coupling for transmitting power between two coupling parts which are rotatable relative to one another. The viscous coupling is provided with two sets of viscous plates which are arranged in an annular chamber filled with a viscous fluid, with each set being associated with one of the coupling parts, wherein one of the sets is held in a plate carrier which can be coupled to, and uncoupled from, the associated coupling part. The plate carrier can be coupled to, and uncoupled from, the respective coupling part by an auxiliary coupling. The friction coupling and the auxiliary coupling can be actuated by a ball/ramp assembly which comprises two ramp discs rotatable relative to one another and which is actuated by rotating one of its two stationary ramp discs by means of an electric motor.

DE 196 50 039 A1 proposes a coupling unit which consists of two coupling parts which are rotatable relative to one another, with a friction coupling being arranged between the two coupling parts, and which is actuated by a ball/ramp mechanism. The ball/ramp mechanism comprises two ramp discs which rotate with one of the coupling parts and of which one can be braked by a viscous coupling. The viscous coupling comprises an annular chamber which is filled with a viscous fluid and which contains two sets of viscous plates, each having a plate carrier. One of the plate carriers of the viscous coupling is connected to the brakable ramp disc and the other plate carrier of the viscous coupling is connected to the other one of the coupling parts.

SUMMARY OF THE INVENTION

It is the object of the present invention to provide a coupling of the type mentioned above which is characterized by a high degree of operational safety and wear resistance.

The objective is achieved in that the axial adjusting device consists of a ball/ramp mechanism with a pressure ring held in one of the parts for rotation therewith and which is axially displaceable. A freely rotatable setting ring which can be braked relative to the other one of the parts, has balls arranged between both rings, which balls are held in ramp-like circumferential grooves in ring faces facing one another. A brake assembly for the setting ring comprises a second viscous coupling having a second annular chamber which is filled with a highly viscous fluid and in which third coupling plates are connected to the setting ring for rotation therewith. Fourth coupling plates are connectable to the other one of the two parts, and arranged so as to alternate in the longitudinal direction wherein the fourth coupling plates are arranged so as to alternate with second clamping rings in said one of the parts. The clamping rings, in turn, are connected for rotation with one of the parts and have a second axial adjusting device for the setting ring of the brake assembly.

A coupling designed in the above way constitutes a viscous coupling which is almost wear-free and which comprises an adjusting mechanism which is also characterized by a viscous coupling forming a braking device for a ball/ramp mechanism. The second viscous coupling is adjusted in a contact-free and low-wear way via electromagnetic forces. In both viscous coupling units, mechanical friction only occurs between the clamping rings and the coupling plates controlled thereby, with the viscous fluid inside the annular chambers, minimizing the amount of wear. The actual coupling forces are generated by fluid shear. The ball/ramp mechanism itself is also characterized by low wear. Selecting a steep ball ramp angle ensures that the viscous coupling opens quickly. This is frequently required in order to ensure that the viscous coupling in the longitudinal driveline is compatible with anti-lock braking systems and driving stability systems.

Alternatively, it may be provided that the first part is formed by a hub and the second part by a housing or that the first part is formed by a housing and the second part by a hub. In a further improvement the pressure ring is connected to the hub for rotation therewith and the setting ring can be braked relative to the housing. According to another improvement the second axial adjusting device may comprise an electromagnetically displaceable pressure plate in the second annular chamber. Herein, preferably, a magnetic coil of the second axial adjusting device is positioned outside the second annular chamber. The two annular chambers are hydraulically connected to one another.

BRIEF DESCRIPTION OF THE DRAWINGS

Preferred embodiments of the invention are described below and illustrated in the drawing wherein.

DETAILED DESCRIPTION OF THE PREFERRED EMBODIMENTS

Figure 1:
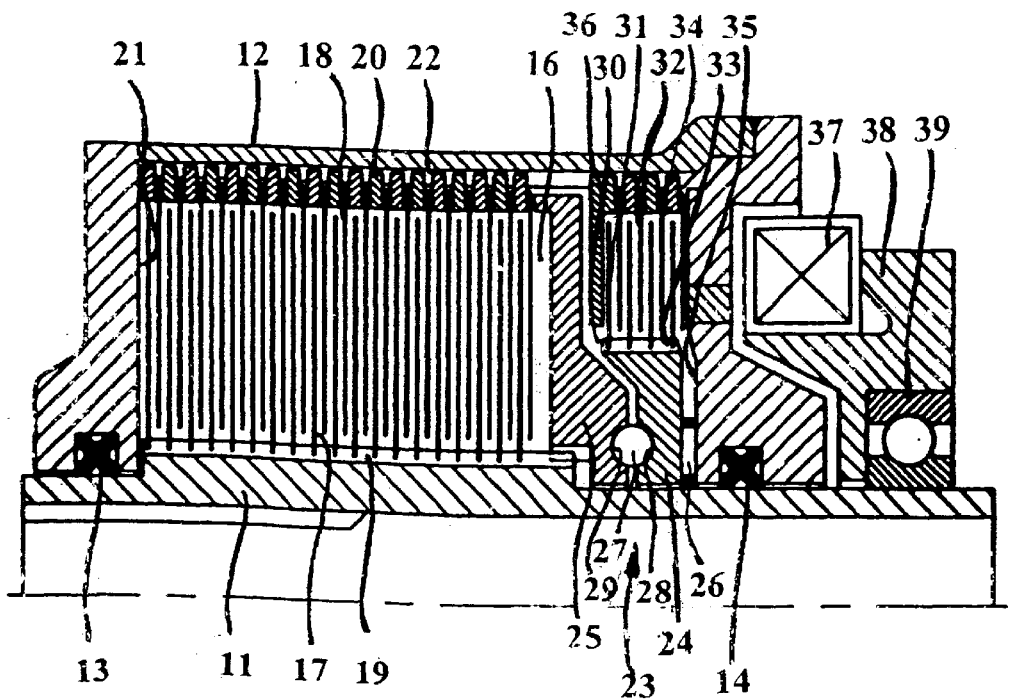
FIG. 1 shows a first embodiment of the inventive viscous coupling, half in section.

In FIG. 1, the inventive viscous coupling substantially comprises a hub 11 constituting the first part, and a housing 12 constituting the second part. The two parts are sealed relative to one another by seals 13, 14 and thus form a first annular chamber 16 in which first plates 17 and second plates 18 are arranged so as to alternate. The first plates 17 are connected by a hub toothing 19 to the hub for rotation therewith. The second plates 18 are arranged so as to alternate with clamping rings 20 which, in turn, are held for rotation therewith on inner toothing 22 in the housing 12. The second plates 18 and the clamping rings 20 are adjustable via a ball/ramp mechanism 23 which comprises a pressure ring 25 which, is rotational therewith and axially displaceable, and is held on the toothing 19 of the hub, as well as a setting ring 24 which is freely rotatable relative to both parts and brakable relative to the housing 12. The setting ring 24 is supported on the housing via an axial bearing 26 and with balls 27 between the two rings, and guided in circumferential grooves 28, 29 which rise ramp-like. The viscous coupling is closed by coupling the second plates 18 to the housing 12 by means of the pressure ring 25 which, when actuated, locks the second plates 18 and the clamping rings 20 relative to the housing, with this assembly being supported against a first inner wall 21 of the housing 12.

In a second annular chamber 30 which, in this embodiment, is hydraulically connected to the first annular chamber, there are arranged third plates 31 and fourth plates 32 which axially alternate. The third plates are held on outer toothing 33 of the setting ring 24 for rotation therewith and are axially displaceable. Fourth plates are arranged so as to alternate with second clamping rings 34 which are held in the inner toothing 22 of the housing 12. The actuation of the brake assembly resulting from the connection of the fourth plates is effected by an electromagnetically adjustable pressure plate 36 which, when actuated, locks the fourth plates 32 and the second clamping rings 34 relative to the housing 12, with this assembly being supported against a second inner wall 35 of the housing 12. The pressure plates 36 can be attracted by a stationary electromagnet 37 which is held in a carrier ring 38, which, in turn, is supported by a radial bearing 39 on the hub 11. The actuation results in the fourth plates 32 being locked to the housing 12, so that the fourth plates 32 which previously were rotated together with the third plates 31 now generate shear forces which hold back the setting ring 24 which, in consequence, is rotated relative to the pressure ring 25. The pressure ring 25 locks the second plates 18 and the clamping rings 20 relative to the housing, as a result of which the previously freely rotating second plates 18 driven by the first plates 17 builds up shear forces and, as a result, the housing 12 is driven by the hub 11 via the forces built up in the viscous coupling. On the other hand, when the pressure plate 36 is released, the hub 11 and the housing 12 are uncoupled.

Figure 2:
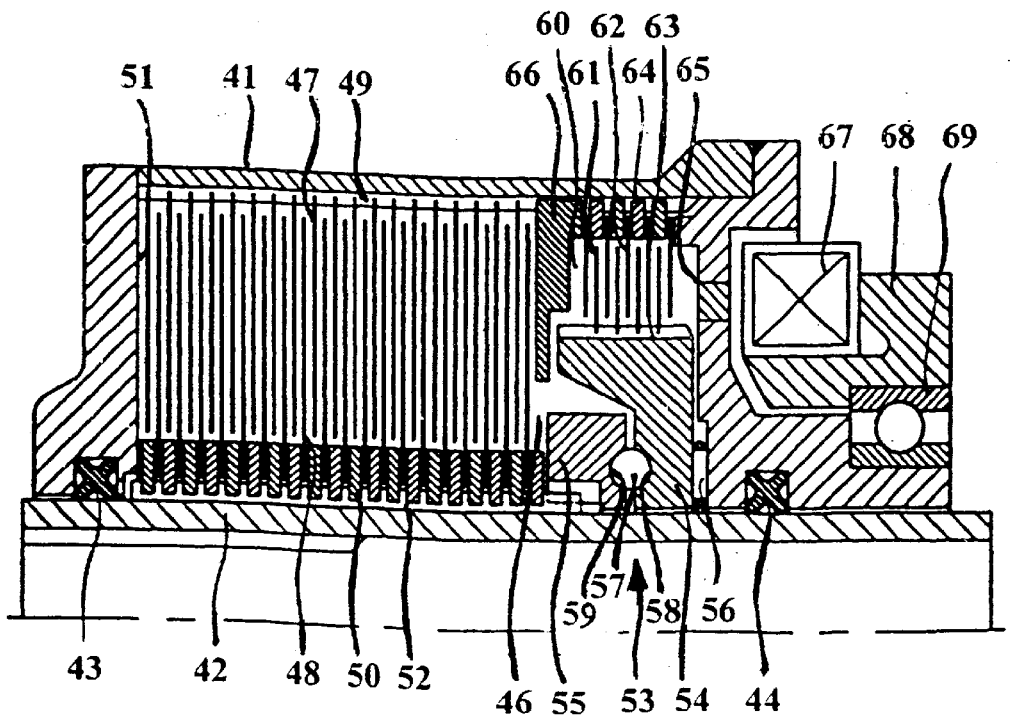
FIG. 2 shows a second embodiment of the inventive viscous coupling, half in section.

In FIG. 2, the inventive viscous coupling substantially comprises a housing 41 constituting the first part, and a hub 42 constituting the second part. The two parts are sealed relative to one another by seals 43, 44 and thus form a first annular chamber 46 in which first plates 47 and second plates 48 are arranged so as to alternate. The first plates 47 are connected by an inner toothing 49 to the housing for rotation therewith. The second plates 48 are arranged so as to alternate with clamping rings 50 which, in turn, are held for rotation therewith by hub toothing 52 on the hub 42. The second plates 48 and the clamping rings 50 are adjustable via a ball/ramp mechanism 53 which comprises a pressure ring 55 which, is axially displaceable, and is held on the toothing 52 of the hub for rotation therewith, as well as a setting ring 54 which is freely rotatable relative to both parts and brakable relative to the housing 41. The setting ring 54 is supported on the housing via an axial bearing 56 and with balls 57, between the two rings, and is guided in circumferential grooves 58, 59 which rise ramp-like. The viscous coupling is closed by coupling the second plates 48 to the hub 42 by means of the pressure ring 55 which, when actuated, locks the second plates 48 and the clamping rings 50 relative to the hub 42, with this assembly being supported against a first inner wall 51 of the housing 42. In a second annular chamber 60 which, in this embodiment, is hydraulically connected to the first annular chamber, there are arranged third plates 61 and fourth plates 62 which are arranged so as to axially alternate, with the third plates 61 being held on outer toothing 63 of the setting ring 54 for rotation therewith in an axially displaceable way. The fourth plates 62 being arranged so as to alternate with second clamping rings 64 which are held in the inner toothing 49 of the housing 41. The actuation of the brake assembly resulting from the connection of the fourth plates 62 is effected by an electromagnetically adjustable pressure plate 66 which, when actuated, locks the fourth plates 62 and the second clamping rings 64 relative to the housing 41, with this assembly being supported against a second inner wall 65 of the housing 41. The pressure plate 66 can be attracted by a stationary electromagnet 67 which is held in a carrier ring 68, which is supported by a radial bearing 69 on the hub 42. Actuation results in the fourth plates 62 being locked to the housing 41, so that the fourth plates 62 which previously were rotated together with the third plates 61 now generate shear forces which hold back the setting ring 54 which, in consequence, is rotated relative to the pressure ring 55. The pressure ring 55 locks the second plates 48 and the clamping rings 50 relative to the hub 52, as a result of which the previously freely rotating second plates 48 driven by the first plates 47 build up shear forces and, as a result, the housing 41 is driven by the hub 41 via the forces built up in the viscous coupling. On the other hand, when the pressure plate 36 is released, the hub 42 and the housing 41 are uncoupled.

I claim:

1. A viscous coupling comprising two parts which are rotatable relative to one another around a common longitudinal axis, said parts forming an annular chamber which is filled with a highly viscous fluid, first coupling plates connected to the first one of said parts for rotation therewith, second coupling plates connected to the second one of said parts and arranged so as to alternate in the longitudinal direction with said first coupling plates, said second coupling plates being alternately arranged with clamping rings on said second one of said parts, said clamping rings in turn, being connected to said second one of said parts for rotation therewith;

a first axial adjusting device which acts on said second coupling plates and on said clamping rings in an axial direction and locks the same relative to one another and to said second one of said parts, said first axial adjusting device having a ball/ramp mechanism with a pressure ring connected to one of said parts and rotationally connected therewith and axially displaceable, a freely rotatable setting ring brakable relative to the other one of said parts, wherein balls are arranged between both of said rings, wherein said balls are held in ramplike circumferential grooves in opposing faces of said rings;

a brake assembly for said setting ring having a second viscous coupling with a second annular chamber filled with a highly viscous fluid in which third coupling plates are connected to said setting ring for rotation therewith, and fourth coupling plates are connectable to the said other one of said two parts, and are arranged so as to alternate in the longitudinal direction with said third coupling plates, and wherein said fourth coupling plates are arranged so as to alternate with second clamping rings on said other one of said parts, said second clamping rings being, in turn, connected to rotate with said other one of said parts; and a second axial adjusting device for said brake assembly for said setting ring.

2. A viscous coupling according to claim 1, wherein said first part is formed by a hub and the second part by a housing.

3. A viscous coupling according to any one of claims 1 or 2, wherein said pressure ring is connected to said hub for rotation therewith and said setting ring is brakable relative to said housing.

4. A viscous coupling according to any one of claims 1 or 2, wherein said second axial adjusting device includes an electromagnetically displaceable pressure plate in said second annular chamber.

5. A viscous coupling according to claims 1 or 2, wherein a magnetic coil of said second axial adjusting device is positioned outside said second annular chamber.

6. A viscous coupling according to any one of claims 1 or 2, wherein said two annular chambers are hydraulically connected to one another.

7. A viscous coupling according to claim 1 wherein said first part is formed by a housing and the second part by a hub.

* * * * *